United States Patent

[11] 3,601,554

[72] Inventor Arthur Rak
Huntington Beach, Calif.
[21] Appl. No. 873,250
[22] Filed Nov. 3, 1969
[45] Patented Aug. 24, 1971
[73] Assignee Bell & Howell Company
Chicago, Ill.

[54] INFORMATION REPLAY METHODS AND APPARATUS
16 Claims, 2 Drawing Figs.

[52] U.S. Cl. .......... 179/100.1PS, 179/100.2 S, 179/100.2 Z, 274/4 C
[51] Int. Cl. .......... G11b 27/12
[50] Field of Search .......... 179/100.2 S, 100.2 Z, 100.3 D, 100.1 PS; 274/4 C, 4 B, 11 B; 352/72, 78, 92

[56] References Cited
UNITED STATES PATENTS

| | | | |
|---|---|---|---|
| 2,396,409 | 3/1946 | Berzer | 179/100.2 S |
| 2,683,568 | 7/1954 | Lindsay | 179/100.2 S |
| 2,913,538 | 11/1959 | Genevay | 179/100.2 S |
| 3,051,777 | 8/1962 | Lemelson | 178/6.6 |

*Primary Examiner*—Richard Murray
*Attorney*—Luc P. Benoit

ABSTRACT: Apparatus and methods for selectively replaying a number of features recorded on a recording medium having a support, in which markings are provided on said support indicative of the beginnings of said features and designating selected ones of said features for replay, and in which feature replay operations are controlled in response to a sensing of said markings to effect replay of said selected features.

INVENTOR.
ARTHUR RAK
BY
[signature]
ATTORNEY

INVENTOR.
ARTHUR RAK
BY [signature]
ATTORNEY

INFORMATION REPLAY METHODS AND APPARATUS

CROSS-REFERENCES TO RELATED APPLICATIONS

Part of the subject matter hereon disclosed is claimed and/or disclosed in the following copending patent applications which are assigned to the assignee of the subject application and which herewith are incorporated by reference herein:

Ser. No. 873,288, Information Replay Methods and Apparatus, filed on Nov. 3, 1969, by Peter G. Peterson; and Ser. No. 873,289, Information Replay Methods and Apparatus, filed on Nov. 3, 1969, by Dexter P. Cooper, Jr., and Arthur Rak.

BACKGROUND

1. Field of the Invention

The subject invention relates to information recording and replay and, more particularly, to methods and apparatus for controlling the replay of a number of recorded features.

2. Prior Art

Throughout the years it has become customary to record several not necessarily interrelated features on the same recording medium. A typical although by no means exclusive case is the long play record which has several musical pieces recorded on each side. More recently, prerecorded magnetic tapes have been appearing on the market having a plurality of features recorded thereon.

These types of records and prerecorded tapes are generally well liked but have the frequently felt drawback that the selection of features provided by the producer does not always correspond to the listerer's choice.

To overcome this drawback, dialing equipment has been provided which permits the listener to select certain of the features for replay. While prior art equipment of this type is capable of saving people from the tedium of having to listen to unwanted features, it generally requires in its operation considerable repetitive effort on the part of the listener.

Briefly, a suitable type of playback apparatus designed in accordance with relevant prior art principles would have a manually actuable push button or dial-type selector by means of which recorded features could be preselected for replay preparatory to each playback operation. The flexible preselection facility thus provided is well adapted to situations in which the typical audience is composed of a large number of people most of which wish to make their own selection of features.

On the other hand, a highly flexible preselection facility becomes a burden in the case of individually owned and operated record or tape collections. In such situations, the individual in question is generally slow to change his opinion as to which features he wishes to listen to and which features he wishes to exclude from a playback of the record or tape. This being the case, an actuation of selector equipment prior to each replay of the record or tape for the mere purpose of repeating the selection of an already predetermined choice becomes a rather cumbersome chore which significantly derogates from the listener's enjoyment.

SUMMARY OF THE INVENTION

The subject invention overcomes these drawbacks and, from one aspect thereof, provides a method of selectively replaying a number of features recorded on a recording medium having a support, comprising the steps of providing on said support a plurality of markings indicative of the beginnings of said features and designating selected ones of said features for replay; instituting a feature replay operation; sensing said markings; and controlling said feature replay operation in response to said sensing of said markings to replay said selected ones of said features.

From another aspect thereof, the invention provides a method of selectively replaying a number of features recorded on a recording medium having a support, comprising the steps providing on said support a plurality of first markings designating selected ones of said features for replay; providing on said support a plurality of second markings indicative of the beginnings of said features; instituting a feature replay operation; sensing said first and second markings; and controlling said feature replay operation in response to said sensing of said first and second markings to replay said selected ones of said features.

The invention also provides apparatus that will be described as the disclosure proceeds.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

Figure 2:
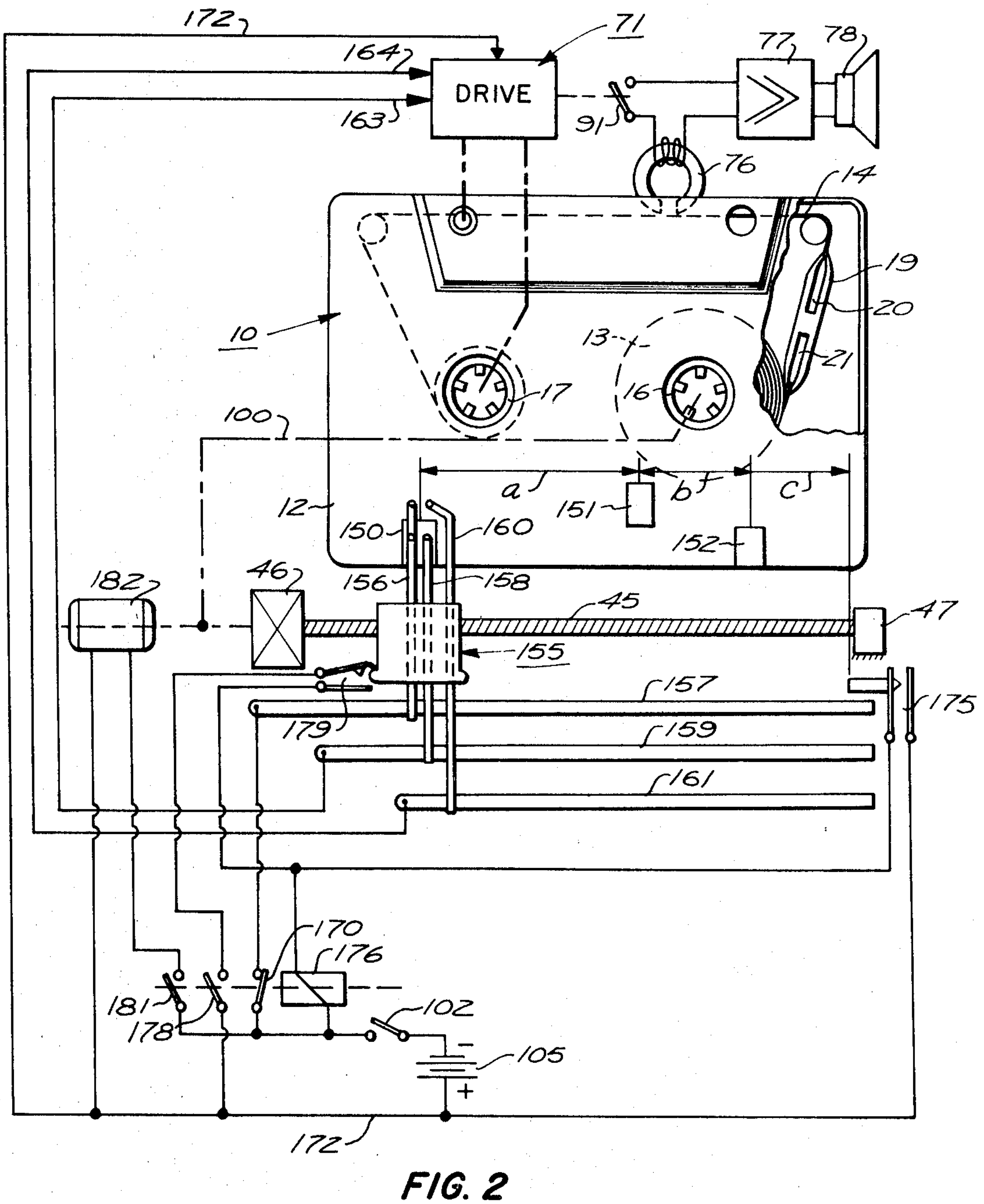
FIG. 2 is a schematic diagram of a playback apparatus in accordance with a second preferred embodiment of the invention.

A plan view of a sound recording cassette 10 suitable for the practice of the subject invention is shown in FIG. 2. This cassette 10 has a housing 12 which contains a supply 13 of magnetic recording tape 14 that may be wound from a tape supply retention member 16 unto a tape takeup member 17.

A number of sound features, such as musical presentations, are recorded on the tape 14. A portion 19 of the tape is shown turned about its side to illustrate two of the magnetically recorded features 20 and 21 which, in practice, are of course not visible to the eye.

Figure 1:
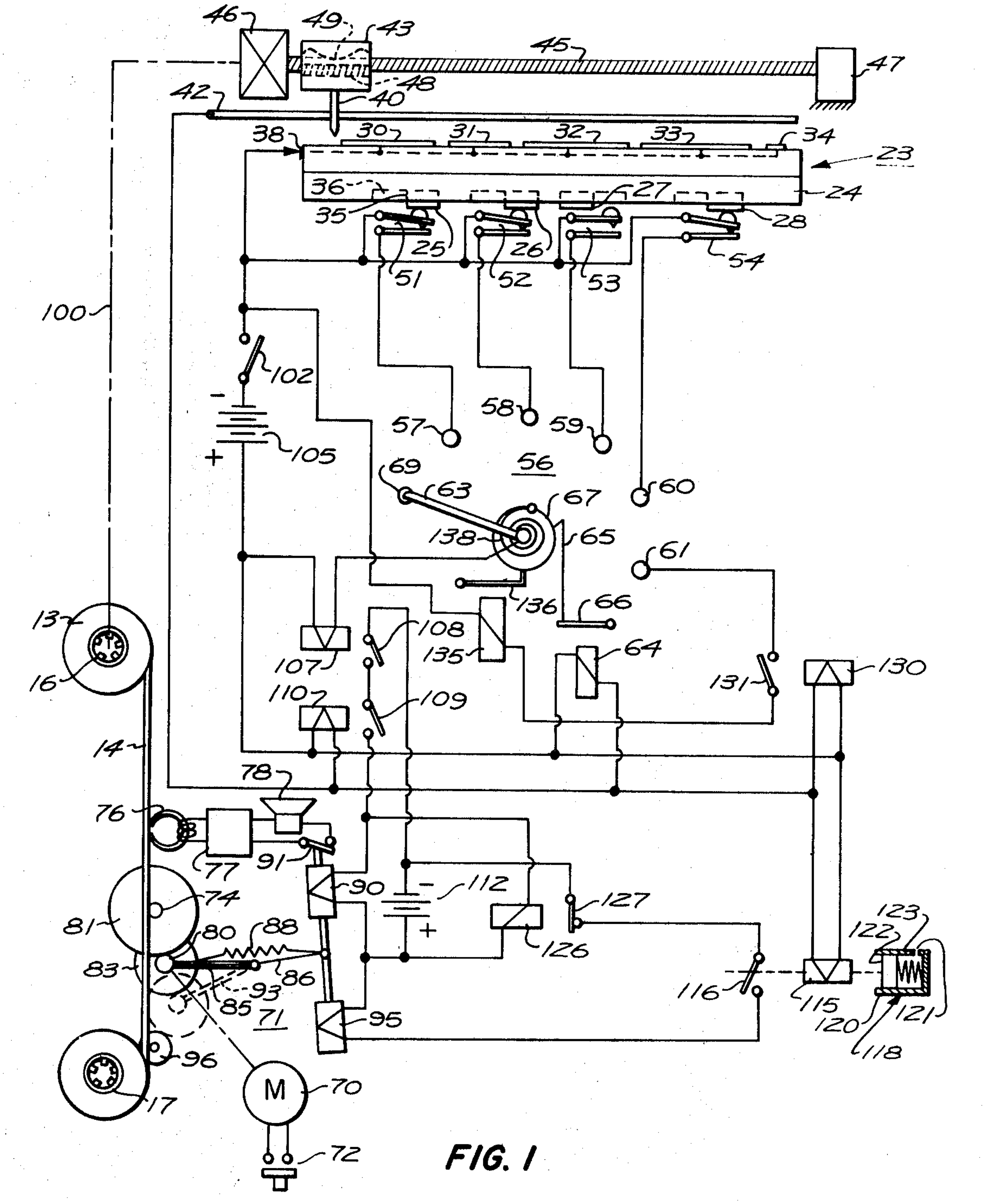
FIG. 1 is a schematic diagram of a play back apparatus in accordance with a first preferred embodiment of the subject invention.

Referring now for the time being to the embodiment shown in FIG. 1, it is to be noted that the tape cassette 23 shown in FIG. 1 is similar to the cassette 10 illustrated in FIG. 2. Even though FIG. 1 for ease of illustration shows the tape supply 13, the magnetic tape 14, the tape supply retention member 16, and the tape takeup member 17 separately from the cassette 23, it should be understood that these parts are actually contained by the housing 25 of the cassette 23 in the same manner as their counterparts in FIG. 2 are contained by the housing 12 of the cassette 10.

Assuming that four features are recorded on the tape 14, four first markings 25, 26, 27 and 28, and four second markings 30, 31, 32, and 33 are provided on the cassette housing 24. Each of the first markings is manually adjustable between a first position (see markings 25, 26 and 28) and a second position (see marking 27). In their first position, the markings indicate that the features to which they are allocated is to be replayed. In their second position, the markings indicate that the features to which they are allocated are to be bypassed during a replay operation of other features.

By way of example, the markings 25 to 28 are shown adjusted in such a manner as to indicate that the first, second and fourth recorded are to be replayed, while the third recorded feature is to be bypassed. In the illustrated preferred embodiment, the markings 25 to 28 are in the form of tabs 35 which are slidable in grooves 36 in the cassette housing 24.

The second markings 30 to 33 indicate the beginnings of the recorded features. More specifically, the marking 30 indicates the beginning of the first recorded feature on the tape 14, the marking 31 indicates the beginning of the second recorded feature, the marking 32 indicates the beginning of the third recorded feature, and the marking 33 indicates the beginning of the fourth recorded feature.

A further marking 34 indicates an end portion of the tape 14 on which no features are recorded. The markings 30 to 34 are of electrically conductive material, and are electrically connected to a contact 38 on the cassette housing 24.

The markings 30 to 34 are sensed by a wiper contact 40 which successively engages these markings and which is in electrical contact with a metal rail 42. The wiper contact 40 is mounted on a carriage 43 which is driven by a spindle 45 that is rotated through a gear 46 and mounted in a bearing 47. The carriage has a semicylindrical nut 48 against the spindle 45. A curved leaf spring 49 biases the nut 48 against the spindle 45 so that the carriage 43 advances upon rotation of the spindle.

The carriage 43 may be manually returned to its illustrated position upon completion of a playback operation. To this end the carriage is depressed against the bias of the spring 49 so that the semicylindrical nut 48 is disengaged from the spindle 45, and is thereupon moved back along the spindle.

The markings 25 to 28 constitute a memory register which is adjusted to store information on what features are to be replayed and what features are to be bypassed. This information is sensed by a bank of electric contacts 51, 52, 53, and 54. Each of these contacts corresponds to one of the markings 25 to 28 and is closed when the corresponding marking is in the first position, and open when the corresponding marking is in the above mentioned second position. Accordingly, if the illustrated positions of markings 25 to 28 prevail, the contacts 51, 52, and 54 are closed, while the contact 53 is open.

A stepping switch or selector 56 has a series of contacts 57, 58, 59, and 60 connected, respectively, to the sensing contacts 51, 52, 53, and 54. The selector 56 further includes a homing contact 61 located beyond the contacts 57 to 60. The contacts 57 to 61 are successively engaged by a selector arm 63 in response to repeated energization of a stepping motor 64. A dog and pawl mechanism 65 transmits the actuating force of the motor anchor 66 to a ratchet wheel 67.

Initially, the selector arm 63 rests on a quiescent state contact 69. During that state a motor 70 in a tape drive 71 is started by actuating an on-off switch 72. The torque of the motor 70 is transmitted through a pulley 80 and flywheel 81 to a capstan 74 which advances the tape 14 from the supply 13 to the takeup member 17 and past a playback head 76 for an aural reproduction of recorded features through an amplifier 77 and loudspeaker 78.

The pulley 80, as well as an associated pulley 83 connected thereto, is rotatably mounted on a pulley mount 85 which forms part of an overcenter mechanism 86 held in either of two bistable positions by a bias spring 88. The overcenter mechanism assumes its illustrated position upon energization of a solenoid actuator 90, at which time a contact 91 is closed to permit aural reproduction of features picked up by the playback head 76.

The alternative position of the mechanism 86, illustrated by a dotted outline 93, is assumed upon energization of a soleoid actuator 95. In that alternative position the pulley 83 is in engagement with a pulley 96 that drives the takeup member 17 for an advance of the tape 14 at a forward speed which is considerably higher than the tape playback speed imparted by the capstan 74. The switch 91 is opened upon energization of the solenoid 95 to prevent an audible reproduction of signals picked up by the head 76 during tape advance at fast forward speed.

The contact wiper 40 is advanced in analogy to the advance of the tape 14. To this effect the tape supply retention member 16 is coupled to the gear 46 as indicated by the phantom line 100, so that the spindle 45 is rotated at a first speed when the tape 14 is advanced at playback speed, and is rotated at an elevated second speed when the tape 14 is advanced at fast forward speed. It should be understood that the phantom line 100 illustrates only one possible mode of advancing the wiper 40 in synchronism with the advance of tape 14, and that the spindle 45 alternatively may be rotated by a synchronous drive controlled by a tachometer which measures tape speed.

To initiate a playback operation, the on-off switch 72 and a main switch 102 are closed. Closure of the switch 72 causes the drive 71 to advance the tape 14 either at playback speed or at fast forward speed, depending on the position the pulley mount mechanism 86 happens to occupy at the time. In either case, the wiper 40 is moved into contact with the marking 30 through rotation of the spindle 45. This establishes the following energizing circuit for the selector motor 64:

negative terminal of battery 105, switch 102, contact 38, marking 30, wiper 40, rail 42, selector motor 64, and positive terminal of battery 105

This steps the selector arm 63 from the contact 69 to the contact 57. If the marking 25 is in the illustrated first position, the contact 51 is closed and the following energizing circuit is established for a relay 107:

negative terminal of battery 105, switch 102, contact 51, contact 57, selector arm 63, relay 107, and positive terminal of battery 105

The relay 107 accordingly closes its contact 108. At that juncture, the contact 109 of a relay 110 is already closed, since the relay 110 is energized in parallel with the selector motor 64. Both of the relay contact 108 and 109 having been closed, the following energizing circuit is established for the solenoid actuator 90:

negative terminal of battery 112, relay contact 108, relay contact 109, solenoid 90, and positive terminal of battery 112

Upon energization of the solenoid actuator 90, the pulley 80 is either moved into contact with the capstan flywheel 81, or remains in contact with that flywheel, depending on whether the mechanism 86 happens to be in the alternative position 93 or in the illustrated position at the time. The tape 14 is therefore advanced at playback speed for a playback of the first feature recorded thereon. This playback operation is not disturbed by the fact that a relay 115 is energized in parallel with the selector motor 64.

To be sure, the relay 115 has a contact 116 in series with the fast forward actuator 95. However, the relay 115 also has a delay device 118 which delays a closure of the contact 116 until such time as a stepping of the selector arm 63 from one contact to the next and the sensing of the position of one of the contacts 51 and 54 pertaining to such next contact have been completed. In the illustrated embodiment the delay device 118 includes a dashpot 120 with an air-escape orifice 121, a movable piston 122, and a spring 123 for a return of the piston upon movement thereof by the relay 115.

Since the the contact 51 is in its closed position, a relay 126 in parallel with the playback actuator 90 opens its normally closed contact 127 in series with the relay contact 116 before the delay device 118 permits that relay contact 116 to close. Accordingly, energization of the relay 115 is not effective to energize the fast forward actuator 95, unless the relay 126 should fail to open its contact 127; such as for the reason to be described below in connection with the marking 53.

As the first feature is being replayed, the wiper 40 moves along the marking 30 in synchronism with the tape advance. In principle, the markings 30 to 33 need not be as long as illustrated. Since the selector arm 63 remains at rest between stepping pulses, each of the markings 30 to 33 need only be long enough to be indicative of the beginnings of the respective features. However, the length of each of the markings 30 to 33 may, if desired, be made proportional to the length of the feature to which it corresponds.

After replay of the first feature, the wiper 40 reaches the marking 31. This causes the selector arm 63 to be stepped to the contact 58. Since the corresponding contact 52 is closed, the second feature is thereupon played back.

After replay of the second feature, the wiper 40 reaches the marking 32. This causes the selector arm 63 to be stepped to the contact 59. Since the corresponding contact 53 is open because of the illustrated position of the marking 27, the relay 107 is unable to close its contact 108. This means that neither the playback actuator 90 nor the relay 126 are energized. In consequence, the relay contact 127 will be closed when the contact 116 is closed upon expiration of the time delay imposed by the delay device 118.

Accordingly, the solenoid actuator 95 is energized through the relay contacts 116 and 127 from the battery 112. As mentioned above, this 164 in an advance of the tape 14 at fast forward speed and a bypass of the particular feature from the playback operation. In this connection, it should be noted that the phrase "indicative of the beginnings of the features" employed herein does not necessarily mean that the beginning of a marking corresponds exactly to the beginning of a feature. To avoid an initial replay of a feature that is to be bypassed, it is better that the markings 30 to 33 be so positioned that they are contacted by the wiper 40 shortly before the particular feature reaches the playback head 76, so that there is time for an opening of the switch 91 if the particular feature is to be bypassed.

When the wiper reaches the marking 33, the selector arm 63 is stepped forward to the contact 60. Since the corresponding contact 54 is closed, the relay 107 is able to close its contact 108 in series to the then closed contact 109, and the actuator 90 is energized. In consequence, the tape 14 is advanced at playback speed and the fourth feature is played back.

After completion of this playback, the wiper 40 reaches the marking 34 that signifies the end of the tape 14. This causes energization of the relays 110 and 130 which close the relay contacts 109 and 131. At the same time the selector motor 64 is energized and advances the selector arm to the contact 61, which establishes the following energization for a homing relay 135.

negative terminal of battery 105, main switch 102, homing relay 135, relay contact 131, selector contact 61, selector arm 63, relay 107, and positive terminal of battery 105

The resulting closure of the contact 108 in series to the already closed contact 109 causes energization of the actuator 90 so that the tape 14 advances at slow speed to its end.

The homing relay 135 actuates a pawl 136 which releases the ratchet wheel 67 so that the selector arm 63 can return by action of a bias spring 138 to the quiescent state contact 69 preparatory to the next playback operation. The homing relay 135 has a time delay so that the release pawl 136 only reengages the ratchet wheel 67 after the selector arm 63 has returned to the contact 69. Also, the length of the marking 34 is limited so that the wiper 40 has been moved past this marking by the time the pawl 136 reengages the ratchet wheel 67.

Upon completion of a playback operation, the wiper 40 may be returned to its initial position by a depression of the carriage 43 and a movement thereof along the spindle 45.

Those skilled in electronics will, of course, realize that all the relay circuits shown in FIG. 1 may be replaced by solid-state circuits in accordance with known circuit design principles.

A further embodiment of the subject invention is illustrated in FIG. 2 where like reference numerals, as among FIGS. 1 and 2, designate like or functionally equivalent parts.

According to FIG. 2 markings 150, 151, and 152, in the form of adhesive metal tabs, are located on the cassette housing 12. These metal tabs may be removed from the cassette and repositioned thereon to indicate a different choice of features.

The markings 150 to 152, which correspond to three features recorded on the tape 14 in the cassette 10, are laterally adjusted in accordance with the length of the feature to which they are allocated. For instance the relative position of the tabs 150, 151, and 152 indicates that the first feature has a length of $a$, the second feature a length of $b$, and the third feature a length of $c$, where the sum of $a$, $b$, and $c$ is total length of all three features.

The markings 150 to 152 are also adjusted to indicate whether a particular feature is or is not to be replayed. For instance a marking in the position of the markings 150 and 152 indicates that the feature to which it is allocated should be replayed. On the other hand, a marking in the position of the marking 151 indicates that the particular feature is to be skipped.

A marking sensor 155 has a first finger 156 in sliding contact with a rail 157, a second finger 158 in sliding contact with a rail 159, and a third finger 160 in sliding contact with a rail 161.

The tape drive 71 has an input 163 connected to the rail 159, and an input 164 connected to the rail 161. The drive advances the tape 14 at playback speed upon energization of the input 163, and at fast forward speed upon energization of the input 164 (compare the actuators 90 and 95 of FIG. 1).

The sensor 155 is mounted on and driven by the spindle 45 which is driven in a first direction through the above mentioned link represented by the phantom line 100, so that the sensor 155 advances in synchronism with the tape 14.

At the beginning, the marking 150 bridges the contact fingers 156 and 158 so that the tape drive input 163 is energized through the following circuit:

negative terminal of battery 105, main switch 102, normally closed relay contact 170, rail 157, finger 156, marking 150, finger 158, rail 159, input 163, common return 172, and positive terminal of battery 105

Accordingly, the tape 14 is advanced at playback speed and the first feature is played back.

When the sensor 155 reaches the marking 151, the contact fingers 156 and 160 will be bridged and the tape drive input 164 will be energized from the battery 105 so that the tape 14 will be advanced at fast forward speed. A playback of the second feature will accordingly be bypassed.

The feature corresponding to the marking 152, on the other hand, will be played back as this marking bridges the fingers 156 and 158 so that the tape drive input 163 is energized.

After exhaustion of the tape 14, the sensor 155 closes an end switch 175 so that a relay 176 is energized from the battery 105. This opens the normally closed contact 170 so that the tape drive 71 cannot be energized through the sensor 155 while the same is returned to its illustrated initial position.

The relay 176 also closes a contact 178 which, through a then closed contact 179, completes a self-holding circuit for the relay 176. In this manner, the relay 176 will remain energized even after the end switch 175 reopens as the sensor 155 returns to its initial position.

The relay 176 further closes a contact 181, which causes energization of a motor 182 from the battery 105. The motor 182 drives the spindle 45 in the reverse direction so that the sensor 155 is returned to its illustrated initial position. At that point, the sensor 155 opens the contact 179 so that the relay 176 is deenergized.

This disconnects the motor 182 from the battery 105 so that the return movement of the sensor 155 is stopped. At the same time the contact 170 returns to its closed position so that a new sensing and playback operation can commence when a new cassette is inserted into the apparatus (or when the cassette 10 is turned over for a playback of further features recorded thereon).

While sound tape recordings have been stressed so far, it should be understood that the invention has a wide application. For instance, its principles may be employed to cause a replay of selected features from video tape recordings. Also, these principles may be used to cause a selective display of chosen motion picture features from a motion picture film which may, for instance, be stored in a cartridge on which markings of the above mentioned type have been provided. In this respect, the expressions "replay" and "playback" employed herein are intended to be broad enough to cover motion picture displays.

While specific embodiments of the invention have been disclosed and illustrated herein, variations and modifications within the scope and spirit of the invention will be apparent or suggest themselves to those skilled in the art.

I claim:

1. A method of selectively replaying a number of features recorded on a recording medium having a support, comprising in combination:

providing on said support a plurality of markings indicative of the beginnings of said features and designating selected ones of said features for replay;

instituting a feature replay operation;

sensing said markings; and controlling said feature replay operation in response to said sensing of said markings to replay said selected ones of said features.

2. A method as claimed in claim 1, including the steps of:

varying said markings for designating different ones of said features for replay;

instituting a further feature replay operation;

sensing said varied markings; and controlling said further feature replay operation in response to said sensing of said varied markings to replay said different ones of said features.

3. A method as claimed in claim 1, wherein:

each marking is selectively placed in a first position and in a second position to indicate, respectively, a desire to replay a particular feature and a desire to bypass replay of a particular feature;

each marking is spaced from an adjacent marking in proportion to the length of a particular feature;

said sensing of said marking proceeds from marking to marking in synchronism with an advance of said recording medium; and said recording medium is advanced at a playback speed in response to sensing of a marking in said first position, and selectively at a forward speed higher than said playback speed in response to sensing of a marking in said second position.

4. A method as claimed in claim 1, wherein:

said support is a casing for said recording medium; and said markings are provided on said casing.

5. A method of selectively replaying a number of features recorded on a recording medium having a support, comprising in combination:

providing on said support a plurality of first markings designating selected ones of said features for replay;

providing on said support a plurality of second markings indicative of the beginnings of said features;

instituting a feature replay operation;

sensing said first and second markings; and controlling said feature replay operation in response to said sensing of said first and second markings to replay said selected ones of said features.

6. A method as claimed in claim 5, including the steps of:

varying said first markings for designating different ones of said features for replay;

instituting a further feature replay operation;

sensing said varied first markings and said second markings; and controlling said further feature replay operation in response to said sensing of said varied first first markings and said second markings to replay said different ones of said features.

7. A method as claimed in claim 5, wherein:

said sensing of said first and second markings includes a sensing of said first markings controlled by a sensing of said second markings.

8. A method as claimed in claim 5, wherein:

each first marking is selectively placed in a first position and in a second position to indicate, respectively, a desire to replay a particular feature and a desire to bypass replay of a particular feature;

said sensing of said first and second markings includes a sensing of said first markings controlled by a sensing of said second markings; and said recording medium is advanced at a playback speed in response to sensing of a first marking in said first position, and selectively at a forward speed higher than said playback speed in response to a sensing of a first marking in said second position.

9. A method as claimed in claim 5, wherein:

said support is a casing for said recording medium; and said first and second markings are provided on said casing.

10. In apparatus for selectively replaying a number of features recorded on a recording medium having a support, the improvement comprising in combination:

a plurality of markings on said support indicative of the beginnings of said features and designating selected ones of said features for replay;

means for instituting and effecting a feature replay operation;

means for sensing said markings; and means connected to said replay instituting and effecting means and said sensing means for controlling said feature replay operation in response to said sensing of said markings to effect replay of said selected features.

11. Apparatus as claimed in claim 10, wherein:

each marking is selectively adjustable to a first position and to a second position to indicate, respectively, a desire to replay a particular feature and a desire to bypass replay of a particular feature;

each marking is spaced from an adjacent marking in proportion to the length of a particular feature;

said sensing means include means proceeding from marking to marking in synchronism with an advance of said recording medium, for sensing the positions of said markings; and said control means include means connected between said sensing means and said replay instituting and effecting means for causing advance of said recording medium at a playback speed in response to a sensing of a marking in said first position, and selectively at a fast forward speed higher than said playback speed in response to sensing of a marking in said second position.

12. Apparatus as claimed in claim 10, wherein:

said support is a casing for said recording medium; and said markings are provided on said casing.

13. In apparatus for selectively replaying a number of features recorded on a recording medium having a support, the improvement comprising in combination:

a plurality of first markings on said support for designating selected ones of said features for replay;

a plurality of second markings on said support indicative of the beginnings of said features;

means for instituting and effecting a feature replay operation;

means for sensing said first and second markings; and means connected to said replay instituting and effecting means and said sensing means for controlling said feature replay operation in response to said sensing of said first and second markings to effect replay of said selected features.

14. Apparatus as claimed in claim 13, wherein:

said sensing means include means for sensing said first markings, and means for sensing said second markings and for controlling said means for sensing said first markings in response to a sensing of said second markings.

15. Apparatus as claimed in claim 13, wherein:

each first marking is selectively movable to a first position and to a second position to indicate, respectively, a desire to replay a particular feature and a desire to bypass replay of a particular feature;

said sensing means include means for sensing the positions of said first markings, means for sensing said second markings and for controlling said means for sensing said first markings in response to a sensing of said second markings; and said means for controlling said feature replay operation include means for effecting advance of said recording medium at a playback speed in response to a sensing by said first sensing means of a first marking in said first position, and for effecting advance of said recording medium at a forward speed higher than said playback speed in response to a sensing by said first sensing means of a first marking in said second position.

16. Apparatus as claimed in claim 13, wherein:

said support is a casing for said recording medium; and said first and second markings are provided on said casing.

PO-1050
(5/69)

UNITED STATES PATENT OFFICE
CERTIFICATE OF CORRECTION

Patent No. 3,601,554 Dated August 24, 1971

Inventor(s) Arthur Rak

It is certified that error appears in the above-identified patent and that said Letters Patent are hereby corrected as shown below:

Column 2, line 19, "play back" should be --playback --.
Column 2, line 61, --features -- should be inserted after "recorded".
Column 5, line 1, "this 164 in" should be --this results in --.
Column 7, line 51, "first", second occurrence, should be deleted.

Signed and sealed this 20th day of November 1973.

SEAL)
ttest:

DWARD M. FLETCHER, JR.
ttesting Officer

RENE D. TEGTMEYER
Acting Commissioner of Patents